United States Patent
Inadome et al.

(10) Patent No.: US 11,649,319 B2
(45) Date of Patent: May 16, 2023

(54) RESIN COMPOSITION FOR FIBER-REINFORCED PLASTIC, CURED PRODUCT OF SAME, AND FIBER-REINFORCED PLASTIC COMPRISING SAID CURED PRODUCT

(71) Applicant: ADEKA CORPORATION, Tokyo (JP)

(72) Inventors: Masato Inadome, Kuki (JP); Naohiro Fujita, Kuki (JP); Kazuhide Morino, Kuki (JP)

(73) Assignee: ADEKA CORPORATION, Tokyo (JP)

( * ) Notice: Subject to any disclaimer, the term of this patent is extended or adjusted under 35 U.S.C. 154(b) by 438 days.

(21) Appl. No.: 16/477,471

(22) PCT Filed: Feb. 26, 2018

(86) PCT No.: PCT/JP2018/006883
§ 371 (c)(1),
(2) Date: Jul. 11, 2019

(87) PCT Pub. No.: WO2018/155672
PCT Pub. Date: Aug. 30, 2018

(65) Prior Publication Data
US 2021/0130538 A1 May 6, 2021

(30) Foreign Application Priority Data

Feb. 27, 2017 (JP) .............................. JP2017-035565

(51) Int. Cl.
| C08J 5/24 | (2006.01) |
| B32B 27/26 | (2006.01) |
| B32B 27/38 | (2006.01) |
| C08L 63/00 | (2006.01) |
| C08G 59/32 | (2006.01) |
| C08G 59/38 | (2006.01) |
| C08G 59/50 | (2006.01) |
| C08G 59/56 | (2006.01) |
| C08K 7/14 | (2006.01) |

(52) U.S. Cl.
CPC ................ C08G 59/56 (2013.01); C08K 7/14 (2013.01)

(58) Field of Classification Search
None
See application file for complete search history.

(56) References Cited

U.S. PATENT DOCUMENTS

| 4,142,034 A * | 2/1979 | Schroll ................. C08G 59/56 528/120 |
| 8,911,586 B2 | 12/2014 | Ogawa et al. |
| 10,557,002 B2 * | 2/2020 | Fujita ...................... C08J 5/046 |
| 2012/0309923 A1 | 12/2012 | Ogawa et al. |
| 2016/0304684 A1 | 10/2016 | Ellinger et al. |
| 2018/0251612 A1 * | 9/2018 | Fujita ..................... C08G 59/50 |

FOREIGN PATENT DOCUMENTS

| CN | 102906149 A | 1/2013 |
| JP | S62-246924 A | 10/1987 |
| JP | H08-225667 A | 9/1996 |
| JP | 2001-294689 A | 10/2001 |
| JP | 2009-013205 A | 1/2009 |
| JP | 2010-174242 A | 8/2010 |
| JP | 2011-162710 A | 8/2011 |
| JP | 2014-019815 A | 2/2014 |
| JP | 2016-210922 A | 12/2016 |
| JP | 2017-008236 A | 1/2017 |
| KR | 10-2013-0001214 A | 1/2013 |
| TW | 201136979 A | 11/2011 |
| TW | 201714955 A | 5/2017 |
| WO | 2011/099292 A1 | 8/2011 |
| WO | 2015/082613 A1 | 6/2015 |
| WO | 2016/095903 A1 | 6/2016 |
| WO | 2017/038603 A1 | 3/2017 |

OTHER PUBLICATIONS

Lesser, A.J. and Crawford, E. (1997), The role of network architecture on the glass transition temperature of epoxy resins. J. Appl. Polym. Sci., 66: 387-395. https://doi.org/10.1002/(SICI)1097-4628(19971010)66:2<387::AID-APP19>3.0.CO;2-V (Year: 1997).*
Extended European Search Report issued in European Patent Application No. 18756930.6 dated Oct. 27, 2020.
International Search Report, dated Aug. 30, 2018, from corresponding PCT application No. PCT/JP2018/006883.

* cited by examiner

Primary Examiner — Michael J Feely
(74) Attorney, Agent, or Firm — Nixon & Vanderhye

(57) ABSTRACT

The present invention provides a resin composition for a fiber-reinforced plastic, the resin composition including a cyanate ester (A), an epoxy resin (B), and an aromatic amine-based curing agent that is liquid at 25° C. (C), wherein the average number of cyanate groups in the cyanate ester (A) is 2.1 or greater, and/or the average number of epoxy groups in the epoxy resin (B) is 2.1 or greater. A fiber-reinforced plastic that is produced using this composition and a reinforcing fiber has favorable heat resistance and excellent tensile and bending properties, and therefore can be applied to a wide variety of fields including transport vehicles such as ships, automobiles, and aircrafts, sporting goods, building materials such as sinks and window frames, as well as industrial machinery and materials such as high-pressure gas tanks and blades for wind power generation.

13 Claims, No Drawings

RESIN COMPOSITION FOR FIBER-REINFORCED PLASTIC, CURED PRODUCT OF SAME, AND FIBER-REINFORCED PLASTIC COMPRISING SAID CURED PRODUCT

TECHNICAL FIELD

The present invention relates to a resin composition for a fiber-reinforced plastic, and more particularly relates to a resin composition for a fiber-reinforced plastic, the resin composition being formed to have a favorable balance between the glass transition temperature (Tg) and the strength when applied to a fiber-reinforced plastic, by adjusting the number of cyanate groups in a cyanate ester and the number of epoxy groups in an epoxy resin, as well as a fiber-reinforced plastic containing a cured product of the composition.

BACKGROUND ART

A method for producing a molded product using a fiber material, such as carbon fiber or glass fiber, and a thermosetting epoxy resin, an unsaturated polyester, a polyamide resin, or a phenol resin serving as a material for reinforcing the fiber material is well known. Fiber-reinforced plastics that are produced using this method are widely used for materials of structures such as aircrafts and ships as well as sporting goods such as tennis rackets and golf clubs. Epoxy resins not only have excellent adhesive properties, heat resistance, and chemical resistance, but are also inexpensive, and therefore epoxy resins are often used in reinforcing materials as a well-balanced material.

Although an epoxy resin composition has excellent electrical performance and adhesive strength, when the epoxy resin is further mixed with a cyanate ester, a triazine ring is formed during curing, and thus a rigid and highly heat-resistant cured product can be obtained. Therefore, an epoxy resin composition in which an epoxy resin is mixed with a cyanate ester is often used as a semiconductor sealing material, or for the purpose of forming an electronic circuit board or the like.

According to Patent Literature 1, a copper clad laminate with favorable electrical properties and heat resistance is provided by producing thin prepregs in which a polyimide resin is added to an epoxy resin and a cyanate ester and laminating the prepregs. According to the invention disclosed in the cited Patent Literature 1, a resin composition having high heat resistance is achieved by using the polyimide resin. However, in the case where this invention is applied to a resin composition for a fiber-reinforced plastic, there are problems with the workability. For example, since the polyimide is a solid, the use is difficult unless a solvent is used, and if a solvent is used, a drying step and the like need to be performed. On the other hand, if the polyimide resin is not used, there are problems with the heat resistance and various properties.

According to Patent Literature 2, a prepreg using a multifunctional cyanate ester that has a biphenyl framework, as well as a laminate plate are provided. The laminate plate and a printed wiring board disclosed in the cited Patent Literature 2 have high heat resistance and low dielectrical properties. However, in the case where the invention disclosed in the cited Patent Literature 2 is used to produce a fiber-reinforced plastic, there are problems in that the cured product has poor conformability to fibers, peeling-off of the resin composition from the fibers or other defects are observed during measurement of various properties such as tensile and bending properties, and as a consequence, a satisfactory fiber-reinforced plastic cannot be obtained.

Usually, in a curing system in which a cyanate ester and an epoxy resin are used, the cyanate ester interacts with a curing agent having an active hydrogen and becomes an active species, the active species then reacts with the epoxy resin, and the polymerization proceeds. If the number of cyanate groups in the cyanate ester, or the number of epoxy groups in the epoxy resin, is too small, the number of reaction sites is small, making it unlikely that the polymerization proceeds, and a satisfactory cured product cannot be obtained.

Furthermore, the curing system in which the cyanate ester and the epoxy resin are used also requires that a suitable curing agent be selected as the curing agent that is used. For example, a curing agent that is highly reactive like aliphatic amines such as meta-xylylenediamine and isophoronediamine has a short pot life when applied to a resin composition for a fiber-reinforced plastic, the resin composition thus cures before the impregnation of fibers is completed, and a uniform fiber-reinforced plastic cannot be obtained. In the case where a latent curing agent that is a solid at normal temperature is used as disclosed in Patent Literature 3, a certain pot life can be ensured; however, since the curing agent is a solid, there are problems in that, when applied to a fiber-reinforced plastic, the curing agent is unlikely to permeate from the surface of the fibers, resulting in the separation of the curing agent from the cyanate ester and the epoxy resin, which prevents the curing reaction from properly proceeding.

CITATION LIST

Patent Literatures

Patent Literature 1: JP 2001-294689A
Patent Literature 2: JP 2010-174242A
Patent Literature 3: U.S. Pat. No. 8,911,586

SUMMARY OF INVENTION

Therefore, an object of the present invention is to provide a resin composition that has high heat resistance, and furthermore, has excellent conformability to fibers and makes it possible to obtain a fiber-reinforced plastic with various favorable properties, such as tensile and bending properties, when used to produce a fiber-reinforced plastic.

To achieve the above-described object, the inventors of the present invention have conducted in-depth research and found that when a cyanate ester and an epoxy resin are used, a resin composition that makes it possible to obtain a cured product having a favorable balance between heat resistance and various properties can be obtained by controlling the average number of cyanate groups and the average number of epoxy groups in the system and using an aromatic amine that is liquid at 25° C. as a curing agent, and thus achieved the present invention. That is to say, the present invention provides a resin composition for a fiber-reinforced plastic, the resin composition including a cyanate ester (A), an epoxy resin (B), and an aromatic amine-based curing agent that is liquid at 25° C. (C), wherein the average number of cyanate groups in the cyanate ester (A) expressed as a formula (1) below is 2.1 or greater, and/or the average number of epoxy groups in the epoxy resin (B) expressed as a formula (2) below is 2.1 or greater.

[Math. 1]

$$\text{Average number of cyanate groups} = \sum_{i=1}^{n} \frac{(A_i \times X_i)}{100} \quad (1)$$

(In the formula (1), "n" represents the number of types of cyanate ester components contained in the cyanate ester (A), $A_i$ represents the number of cyanate groups in an i-th cyanate ester component contained in the cyanate ester (A), and $X_i$ represents the content ratio by mass of the i-th cyanate ester component in the cyanate ester (A).)

[Math. 2]

$$\text{Average number of epoxy groups} = \sum_{k=1}^{n} \frac{(B_k \times Y_k)}{100} \quad (2)$$

(In the formula (2), "n" represents the number of types of epoxy resin components contained in the epoxy resin (B), $B_k$ represents the number of epoxy groups in a k-th epoxy resin component contained in the epoxy resin (B), and $Y_k$ represents the content ratio by mass of the k-th epoxy resin component in the epoxy resin (B).)

DESCRIPTION OF EMBODIMENTS

Hereinafter, an embodiment of a resin composition for a fiber-reinforced plastic of the present invention will be described.

Cyanate Ester (A)

A cyanate ester serving as a component (A) used in the present invention is a compound that has a cyanate group in a molecule. The cyanate ester serving as the component (A) may be composed of a single type of cyanate ester or may be a mixture of a plurality of types of cyanate esters. With respect to the cyanate ester serving as the component (A), it is preferable that the average number of cyanate groups in the entire component (A) expressed as a formula (1) below is 2.1 or greater.

[Math. 3]

$$\text{Average number of cyanate groups} = \sum_{i=1}^{n} \frac{(A_i \times X_i)}{100} \quad (1)$$

(In the formula (1), "n" represents the number of types of cyanate ester components contained in the cyanate ester (A), $A_i$ represents the number of cyanate groups in an i-th cyanate ester component contained in the cyanate ester (A), and $X_i$ represents the content ratio by mass of the i-th cyanate ester component in the cyanate ester (A).)

With respect to the above-described formula (1), for example, in the case where the cyanate ester (A) is a mixture containing three types of cyanate esters, "n" is 3. At this time, the three types of cyanate esters are referred to as a component 1, a component 2, and a component 3, respectively, and the numbers of cyanate groups in these components are represented by components 1, 2, and 3. Moreover, the content ratios by mass of the components $A_1$, $A_2$, and $A_3$ are represented by $X_1$, $X_2$, and $X_3$, respectively, and the average number of cyanate groups at this time is calculated according to $\{(A_1 \times X_1)+(A_2 \times X_2)+(A_3 \times X_3)\}/100$. Then, it is preferable that the value of the number of cyanate groups in the cyanate ester (A) used in the present invention is 2.1 or greater, the value being obtained according to the above-described formula (1).

In light of the balance between Tg of a cured product and the reliability of a fiber-reinforced plastic, the above-described average number of cyanate groups is preferably 2.1 to 5.0, more preferably 2.2 to 5.0, and even more preferably 2.4 to 4.1. If the average number of cyanate groups is greater than the above-described range, the resin composition has high viscosity, making it impossible to impregnate fibers with the whole amount of the resin composition, and therefore, it tends to be difficult to form a fiber-reinforced plastic.

In the case where the cyanate ester (A) used in the present invention is composed of a single type of cyanate ester, it is preferable that the number of cyanate groups in that cyanate ester is within the above-described range. Moreover, in the case where the cyanate ester (A) of the present invention is a mixture of a plurality of types of cyanate esters, it is preferable to set the average number of cyanate groups in the mixture to be within the above-described range by adjusting the amounts of cyanate esters added to the mixture.

For example, it is preferable to use at least one compound and/or prepolymer selected from the group consisting of a compound represented by a general formula (3-1) below, a prepolymer of the compound represented by the general formula (3-1) below, and a compound represented by a general formula (3-2) below as the cyanate ester (A) of the present invention.

[Chem. 1]

NCO—$R^b$—$R^a$—$R^c$—OCN (3-1)

(In the general formula (3-1), IV represents a single bond, —S—, or a divalent hydrocarbon group, $R^b$ and $R^c$ each independently represent a phenylene group that is unsubstituted or substituted with 1 to 4 alkyl groups, and when $R^b$ and $R^c$ are substituted with 2 to 4 alkyl groups, the alkyl groups may be the same or different.)

[Chem. 2]

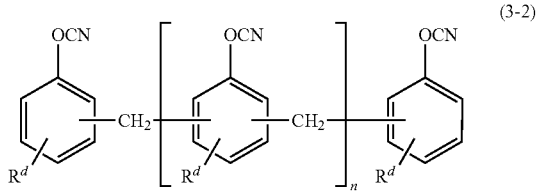

(3-2)

(In the general formula (3-2), "n" represents an integer of 1 to 10, and $R^d$ represents a hydrogen atom or an alkyl group having 1 to 4 carbon atoms.)

Examples of the divalent hydrocarbon group represented by $R^a$ in the general formula (3-1) include an alkylene group having 1 to 8 carbon atoms, a cycloalkylene group having 3 to 13 carbon atoms, an arylene group having 6 to 12 carbon atoms, an arylenealkylene group, and an arylenedialkylene group.

Examples of the alkylene group having 1 to 8 carbon atoms include methylene, ethylene, propylene, methylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, octylene, ethane-1,1-diyl, and propane-2,2-diyl.

Examples of the cycloalkylene group having 3 to 13 carbon atoms include a 1,2-cyclopropylene group, a 1,3-cycloheptylene group, and a trans-1,4-cyclohexylene group.

Examples of the arylene group having 6 to 12 carbon atoms include phenylene, tolylene, and naphthylene.

Examples of the arylenealkylene group include phenylenemethylene and phenyleneethylene.

Examples of the arylenedialkylene group include phenylenedimethylene and phenylenediethylene.

The methylene chain in the alkylene group having 1 to 8 carbon atoms, the arylenealkylene group, and the arylenedialkylene group may be substituted with —O—, —S—, —CO—, or —C=C—.

The alkylene group having 1 to 8 carbon atoms, the arylene group having 6 to 12 carbon atoms, the arylenealkylene group, and the arylenedialkylene group may be substituted with a cyano group, a carboxyl group, an alkyl group having 1 to 4 carbon atoms, a hydroxyl group, an alkoxy group having 1 to 4 carbon atoms, or a halogen atom. Examples of the alkyl group having 1 to 4 carbon atoms with which the alkylene group having 1 to 8 carbon atoms may be substituted include alkyl groups having 1 to 4 carbon atoms, which will be described later, and examples of the alkoxy group having 1 to 4 carbon atoms include alkyl groups having 1 to 4 carbon atoms and interrupted by an oxygen atom, which will be described later.

An example of the alkyl groups that are represented by $R^b$ and $R^c$, with which phenylene may be substituted, in the general formula (3-1) is an alkyl group having 1 to 8 carbon atoms. Examples of the alkyl group having 1 to 8 carbon atoms include methyl, ethyl, propyl, isopropyl, butyl, secondary butyl, tertiary butyl, isobutyl, amyl, isoamyl, secondary amyl, tertiary amyl, hexyl, 1-ethylpentyl, cyclohexyl, 1-methylcyclohexyl, heptyl, isoheptyl, tertiary heptyl, n-octyl, isooctyl, tertiary octyl, and 2-ethylhexyl.

Examples of the alkyl group having 1 to 4 carbon atoms that is represented by $R^d$ in the general formula (3-2) include methyl, ethyl, propyl, isopropyl, butyl, isobutyl, and t-butyl.

In light of being readily available or the like, it is preferable that the compound represented by the above-described general formula (3-1) is a compound represented by a general formula (3-3) below.

[Chem. 3]

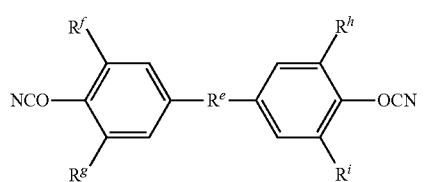

(3-3)

(In the general formula (3-3), $R^e$ represents a single bond, a methylene group, —CH(CH$_3$)—, —C(CH$_3$)$_2$—, or any one of functional groups represented by general formulae (4-1) to (4-8) below, and $R^f$, $R^g$, $R^h$, and $R^i$ each independently represent a hydrogen atom or an alkyl group having 1 to 4 carbon atoms.)

[Chem. 4]

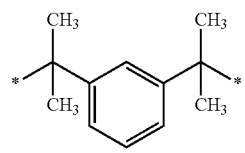

(4-1)

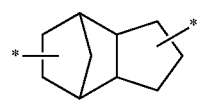

(4-2)

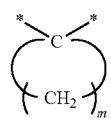

(4-3)

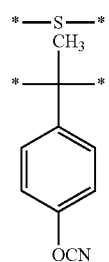

(4-4)

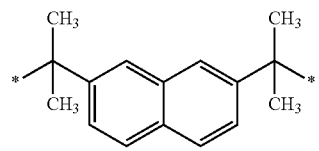

(4-6)

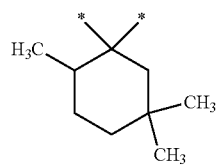

(4-7)

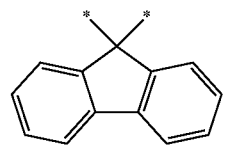

(4-8)

(In the general formula (4-3), "m" represents an integer of 4 to 12, and in the general formulae (4-1) to (4-8), "*" represents a bond.)

Examples of the alkyl group having 1 to 4 carbon atoms that is represented by $R^f$, $R^g$, $R^h$, and $R^i$ in the general formula (3-3) include methyl, ethyl, propyl, isopropyl, butyl, isobutyl, and t-butyl.

Examples of the compound represented by the above-described general formula (3-3) include bis(4-cyanatophenyl)methane, bis(3,5-dimethyl-4-cyanatophenyl)methane, 1,1-bis(4-cyanatophenyl)ethane, 2,2-bis(4-cyanatophenyl)propane, and the like.

It is especially preferable that the cyanate ester (A) used in the present invention is a compound represented by the above-described general formula (3-2), 1,1-bis(4-cyanatophenyl)ethane, or 2,2-bis(4-cyanatophenyl)propane, in light of the ready availability thereof and the heat resistance of a cured product.

The amount of the cyanate ester (A) contained in the resin composition for a fiber-reinforced plastic of the present invention is preferably 10 to 200 parts by mass, more preferably 30 to 150 parts by mass, and even more preferably 50 to 120 parts by mass, with respect to 100 parts by mass of the epoxy resin (B), which will be described later. If the cyanate ester (A) content is less than 10 parts by mass, the strength of the resin composition tends not to increase, and if the cyanate ester (A) content is greater than 200 parts by mass, the adhesion of the resin composition to a base material tends to decrease significantly.

Epoxy Resin (B)

An epoxy resin serving as a component (B) used in the present invention is a compound that has an epoxy group in a molecule. The epoxy resin serving as the component (B) may be composed of a single type of epoxy resin or may be a mixture of a plurality of types of epoxy resins. With respect to the epoxy resin serving as the component (B), it is preferable that the average number of epoxy groups in the entire component (B) expressed as a formula (2) below is 2.1 or greater.

[Math. 4]

$$\text{Average number of epoxy groups} = \sum_{k=1}^{n} \frac{(B_k \times Y_k)}{100} \quad (2)$$

(In the formula (2), "n" represents the number of types of epoxy resin components contained in the epoxy resin (B), $B_k$ represents the number of epoxy groups in a k-th epoxy resin component contained in the epoxy resin (B), and $Y_k$ represents the content ratio by mass of the k-th epoxy resin component in the epoxy resin (B).)

With respect to the formula (2) above, for example, in the case where the epoxy resin (B) is a mixture of three types of epoxy resin components, "n" is 3. At this time, the three types of epoxy resins are referred to as a component 1, a component 2, and a component 3, respectively, and the numbers of epoxy groups in these components are represented by components 1, 2, and 3. Moreover, the content ratios by mass of the components $B_1$, $B_2$, and $B_3$ in the epoxy resin (B) are represented by $Y_1$, $Y_2$, and $Y_3$, respectively. The average number of cyanate groups at this time is calculated according to $\{(B_1 \times Y_1)+(B_2 \times Y_2)+(B_3 \times Y_3)\}/100$. The value of the above-described average number of epoxy groups in the epoxy resin (B) used in the present invention is preferably 2.2 to 5.0, and more preferably 2.5 to 4.0. If the average number of epoxy groups is smaller than the above-described range, Tg of the cured product does not improve, and the heat resistance tends to decrease. If the average number of epoxy groups is greater than the above-described range, it is difficult to obtain a corresponding epoxy resin, the resin composition also has high viscosity, and therefore, the practicability tends to be poor.

In the case where the epoxy resin (B) used in the present invention is composed of a single type of epoxy resin, it is preferable that the number of epoxy groups in that epoxy resin is within the above-described range. In the case where the epoxy resin (B) of the present invention is a mixture of a plurality of types of epoxy resins, it is preferable to set the above-described average number of epoxy groups in the mixture to be within the above-described range by adjusting the amounts of the epoxy resins added to the mixture.

Specific examples of the epoxy resin (B) of the present invention include polyglycidyl ether compounds of mononuclear polyphenol compounds such as hydroquinone, resorcin, pyrocatechol, and phloroglucinol; polyglycidyl ether compounds of polynuclear polyphenol compounds such as dihydroxynaphthalene, biphenol, methylenebisphenol (bisphenol F), methylenebis(orthocresol), ethylidenebisphenol, isopropylidenebisphenol (bisphenol A), isopropylidenebis(orthocresol), tetrabromobisphenol A, 1,3-bis(4-hydroxycumylbenzene), 1,4-bis(4-hydroxycumylbenzene), 1,1,3-tris(4-hydroxyphenyl)butane, 1,1,2,2-tetra(4-hydroxyphenyl)ethane, thiobisphenol, sulfobisphenol, oxybisphenol, phenol novolac, orthocresol novolac, ethylphenol novolac, butylphenol novolac, octylphenol novolac, resorcin novolac, and terpene phenol; naphthalene type epoxy resins, which are polyglycidyl ethers of diols containing a naphthalene framework such as α-naphthol, β-naphthol, 1,5-dihydroxynaphthalene, 1,6-dihydroxynaphthalene, and 2,6-dihydroxynaphthalene, as well as compounds obtained by condensing these diols with aldehyde in the presence of an acidic catalyst; fluorene type epoxy resins, which are diglycidyl ethers of diols having a fluorene framework such as 9,9-bis[4-(2-hydroxyethoxy)phenyl]fluorene, 9,9-bis(4-hydroxyphenyl)fluorene, and 9,9-bis(4-hydroxy-3-methylphenyl)fluorene; polyglycidyl ethers of polyhydric alcohols such as ethylene glycol, propylene glycol, butylene glycol, hexanediol, polyglycol, thiodiglycol, dicyclopentadienedimethanol, 2,2-bis(4-hydroxycyclohexyl) propane (hydrogenated bisphenol A), glycerol, trimethylolpropane, pentaerythritol, sorbitol, and a bisphenol A-ethylene oxide adduct; homopolymers or copolymers of glycidyl esters and glycidyl methacrylate of aliphatic, aromatic, or alicycric polybasic acids such as maleic acid, fumaric acid, itaconic acid, succinic acid, glutaric acid, suberic acid, adipic acid, azelaic acid, sebacic acid, dimer acid, trimer acid, phthalic acid, isophthalic acid, terephthalic acid, trimellitic acid, trimesic acid, pyromellitic acid, tetrahydrophthalic acid, hexahydrophthalic acid, and endomethylene tetrahydrophthalic acid; epoxy compounds having a glycidyl amino group, such as N,N-diglycidylaniline, bis(4-(N-methyl-N-glycidylamino)phenyl)methane, diglycidyl orthotoluidine, N,N-bis(2,3-epoxypropyl)-4-(2,3-epoxypropoxy)-2-methylaniline, N,N-bis(2,3-epoxypropyl)-4-(2,3-epoxypropoxy) aniline, and N,N,N',N'-tetra(2,3-epoxypropyl)-4,4'-diaminodiphenylmethane; epoxidation products of cyclic olefin compounds such as vinylcyclohexene diepoxide, dicyclopentanediene diepoxide, 3,4-epoxycyclohexylmethyl-3,4-epoxycyclohexanecarboxylate, 3,4-epoxy-6-methylcyclohexylmethyl-6-methylcyclohexanecarboxylate, and bis(3,4-epoxy-6-methylcyclohexylmethyl)adipate; and heterocyclic compounds such as epoxidated, conjugated diene polymers such as epoxidated polybutadiene and an epoxidated styrene-butadiene copolymer, and triglycidyl isocyanurate. Moreover, these epoxy resins may be internally cross-linked by a prepolymer having isocyanate groups at terminals, or may be polymerized with a multivalent active hydrogen compound (polyphenol, polyamine, a carbonyl group-containing compound, a polyphosphoric acid ester, or the like).

Among the above-listed epoxy resins, liquid epoxy resins are preferable in light of favorable fiber impregnation properties. Polyglycidyl ether compounds of mononuclear polyphenol compounds, polyglycidyl ether compounds of polynuclear polyphenol compounds, fluorene type epoxy resins, polyglycidyl ethers of polyhydric alcohols, and epoxy compounds having a glycidyl amino group are more preferable in light of the ready availability thereof and the ease of adjustment of the average number of epoxy groups. Bisphenol A type epoxy resins, bisphenol F type epoxy resins, N,N-bis(2,3-epoxypropyl)-4-(2,3-epoxypropoxy)-2-methylaniline, N,N-bis(2,3-epoxypropyl)-4-(2,3-epoxypropoxy) aniline, and N,N,N',N'-tetra(2,3-epoxypropyl)-4,4'-diaminodiphenylmethane are even more preferable.

In a curing system in which a cyanate ester and an epoxy resin are used, if the cross-linking density is excessively increased, the cured product is excessively strong, exhibits low stress relaxation properties when applied to a fiber-reinforced plastic, and therefore tends not to provide a satisfactory fiber-reinforced plastic. Conversely, if the cross-linking density is excessively low, there are cases where polymerization is difficult and the cured product therefore has a problem with strength. For this reason, it is necessary to adjust the number of reactive functional groups (cyanate groups and epoxy groups) in the cyanate ester (A) and the epoxy resin (B). That is to say, in the present invention, it is essential to set the average number of cyanate groups expressed as the formula (1) above to be 2.1 or greater and/or to set the average number of epoxy groups expressed as the formula (2) above to be 2.1 or greater. In the present invention, when considering the average number of cyanate groups and the average number of epoxy groups, it is preferable to increase the average number of epoxy groups expressed as the formula (2) above, rather than to increase the average number of cyanate groups expressed as the formula (1) above, because Tg of the cured product can be improved even further. In that case, the average number of epoxy groups is preferably 2.2 to 5.0, and more preferably 2.5 to 4.0.

In the case where the average number of epoxy groups is set to be 2.1 or greater, the average number of cyanate groups may be less than 2.1, but is preferably 1.8 or greater, more preferably 1.9 or greater, and even more preferably 2.0 or greater.

Aromatic Amine-Based Curing Agent that is Liquid at 25° C. (C)

An aromatic amine-based curing agent that is liquid at 25° C. (C) used in the present invention is a compound that is liquid at 25° C. so as to be able to easily permeate a fiber material and, furthermore, in which an amino group is directly attached to an aromatic ring. Examples of such compounds include diaminodimethyldiphenylmethane, diaminodiethyldiphenylmethane, diaminodiethyltoluene, 1-methyl-3,5-bis(methylthio)-2,4-benzenediamine, 1-methyl-3,5-bis(methylthio)-2,6-benzenediamine, and the like.

Among these, diaminodiphenylmethane, diaminodimethyldiphenylmethane, and diaminodiethyltoluene are preferable in light of improvement in the heat resistance of the cured product, and diaminodiethyldiphenylmethane is more preferable.

In the present invention, the aromatic amine-based curing agent that is liquid at 25° C. (C) is used in an amount of preferably 20 to 100 parts by mass, and more preferably 40 to 90 parts by mass, with respect to 100 parts by mass of the epoxy resin (B). If this amount is less than 20 parts by mass or greater than 100 parts by mass, the resin composition tends not to be completely cured.

The resin composition for a fiber-reinforced plastic of the present invention may contain a light-absorbing component (D). In the case where the resin composition contains the light-absorbing component (D), the curing time can be reduced even further by irradiating the resin composition with active energy rays. As a result of the reduction in the curing time, the operation time is reduced, and curing can be performed with less energy compared with a case where curing is performed through heating. Therefore, not only economic advantages but also environmental advantages can be obtained.

The light-absorbing component (D) contained in the resin composition of the present invention is a component that is capable of absorbing the above-described active energy rays and emitting heat energy, and the emitted heat energy can cure the resin composition. From the standpoint of allowing the resin composition to permeate gaps between fibers, a light-absorbing component that is liquid at 25° C., or a light-absorbing component that can be compatibilized and liquefied when mixed with another material, is preferable as the above-described light-absorbing component. Examples of such compounds include aniline black, a metal complex, a squaric acid derivative, immonium dye, polymethine, a phthalocyanine compound, a naphthalocyanine compound, a perylene compound, a quaterrylene compound, and a nigrosine compound. In the present invention, among these compounds, it is more preferable to use a nigrosine compound in light of the ready availability thereof.

Examples of commercially-available nigrosine compounds include a BONASORB series, an eBIND ACW series, an eBIND LTW series, an eBIND LAW series, an ORIENT NIGROSINE series, and a NUBIAN BLACK series manufactured by Orient Chemical Industries Co., Ltd. In the present invention, among these nigrosine compounds, it is preferable to use the NUBIAN BLACK series because this series is inexpensive and readily available. These nigrosine compounds may be used alone or in a combination of two or more.

The amount added of the light-absorbing component (D) contained in the resin composition of the present invention can be set to be within a range of 0.001 to 1 mass % with respect to the total amount of the resin composition. With consideration given to the balance between the curing rate of the resin composition and the heat generation (scorching of the composition), the above-described amount added is preferably 0.01 to 0.5 mass %, and more preferably 0.05 to 0.2 mass %. If this amount is less than 0.001%, sufficient heat generation cannot be achieved by merely irradiating the resin composition with the active energy rays, and complete curing of the resin composition is difficult. On the other hand, if this amount is greater than 1%, the active energy rays are mostly absorbed on the surface of the resin composition, and only the surface of the resin composition is carbonized, without allowing the active energy to go into the inside thereof. Therefore, complete curing of the resin composition to the inside thereof is difficult.

Additives

Additives may be used in the resin composition of the present invention as necessary.

Examples of the above-described additives include commonly used additives, such as non-reactive diluents (plasticizers) such as dioctyl phthalate, dibutyl phthalate, benzyl alcohol, and coal tar; pigments; silane coupling agents such as γ-aminopropyltriethoxysilane, N-β-(aminoethyl)-γ-aminopropyltriethoxysilane, N-β-(aminoethyl)-N'-β-(aminoethyl)-γ-aminopropyltriethoxysilane, γ-anilinopropyltriethoxysilane, γ-glycidoxypropyltriethoxysilane, β-(3,4-epoxycyclohexyl)ethyltriethoxysilane, vinyltriethoxysilane, N-β-(N-vinylbenzylaminoethyl)-γ-aminopropyltriethoxysilane, γ-methacryloxypropyltrimethoxysilane, γ-chloropropyltrimethoxysilane, γ-mercaptopropyltrimethoxysilane, and γ-isocyanatepropyltriethoxysilane; titanium coupling agents such as isopropyltriisostearoyl titanate, isopropyl tri-n-dodecylbenzenesulfonyl titanate, isopropyltris(dioctylpyrophosphate) titanate, tetraisopropylbis(dioctylphosphite) titanate, tetraoctylbis(ditridecylphosphite) titanate, tetra(2,2-diallyloxymethyl-1-butyl)bis(di-tridecyl)phosphite titanate, bis(dioctylpyrophosphate)oxyacetate titanate, bis (dioctylpyrophosphate)ethylene titanate, isopropyltrioctanoyl titanate, is opropyldimethacryloylis ostearoyl titanate, isopropylisostearoyldiacryl titanate, is opropyltri (dioctylpho sphate) titanate, isopropyltricumylphenyl titanate, isopropyltri(N-aminoethyl-aminoethyl) titanate, tetraisopropyl titanate, tetranormalbutyl titanate, butyl titanate dimers, tetrakis(2-ethylhexyl) titanate, tetrastearyl titanate, tetramethyl titanate, diethoxybis(acetylacetonato) titanium, diisopropylbis(acetylacetonato) titanium, diisopropoxybis(ethylaceto acetate) titanium, isopropoxy(2-ethyl-1,3-hexanediolato) titanium, di(2-ethylhexoxy)bis(2-ethyl-1,3-hexanediolato) titanium, di-n-butoxybis(triethanolaminato) titanium, tetraacetylacetonate titanium, hydroxybis(lactato) titanium, dicumylphenyloxyacetate titanate, and diisostearoylethylene titanate; zirconium-based coupling agents such as neoalkoxytrisneodecanoyl zirconate, neoalkoxytris(dodecyl)benzenesulfonyl zirconate, neoalkoxytris(dioctyl)phosphate zirconate, neoalkoxytris (dioctyl)pyrophosphate zirconate, neoalkoxytris(ethylenediamino)ethyl zirconate, neoalkoxytris(m-amino)phenyl zirconate, tetra(2,2-diallyloxymethyl)butyl, di(ditridecyl) phosphito zirconate, neopentyl(diallyl)oxy, trineodecanoyl zirconate, neopentyl(diallyl)oxy, tri(dodecyl)benzene-sulfonyl zirconate, neopentyl(diallyl)oxy, tri(dioctyl)phosphato zirconate, neopentyl(diallyl)oxy, tri(dioctyl)pyro-phosphato zirconate, neopentyl(diallyl)oxy, tri(N-ethylenediamino) ethyl zirconate, neopentyl(diallyl)oxy, tri(m-amino)phenyl zirconate, neopentyl(diallyl)oxy, trimethacryl zirconate, neopentyl(diallyl)oxy, triacryl zirconate, dineopentyl(diallyl)oxy, diparaaminobenzoyl zirconate, dineopentyl(diallyl) oxy, di(3-mercapto)propionic zirconate, zirconium(IV) 2,2-bis(2-propenolatomethyl)butanolato, cyclodi[2,2-(bis2-propenolatomethyl)butanolato]pyrophosphato-O,O, neoalkoxytrisneodecanoyl zirconate, neoalkoxytris(dodecyl)benzenesulfonyl zirconate, neoalkoxytris(dioctyl) phosphate zirconate, neoalkoxytris(dioctyl)pyrophosphate zirconate, neoalkoxytris(ethylenediamino)ethyl zirconate, neoalkoxytris(m-amino)phenyl zirconate, as well as zirconium-based coupling agents such as tetranormalpropoxy zirconium, tetranormalbutoxy zirconium, zirconium tetraacetylacetonate, zirconium tributoxyacetylacetonate, zirconium tributoxystearate, zirconium dibutoxybis(acetylacetonate), zirconium dibutoxybis(acetylacetonate), zirconium tributoxyethylacetoacetate, and zirconium monobutoxyacetylacetonatebis(ethylacetoacetate); lubricants such as candelilla wax, carnauba wax, sumac wax, privet wax, beeswax, lanolin, spermaceti, montan wax, petroleum wax, fatty acid wax, fatty acid ester, fatty acid ether, aromatic ester, and aromatic ether; thickners; thixotropic agents; antioxidants; light stabilizers; ultraviolet light absorbers; flame retardants; antifoaming agents; and antirust agents.

Among the above-listed additives, additives that are liquid at 25° C. or that are soluble in the cyanate ester, the epoxy resin, or the aromatic amine-based curing agent are preferable in light of impregnation of fibers. It is more preferable to add a silane coupling agent in light of improvement in adhesion to fibers, it is even more preferable to add γ-aminopropyltriethoxysilane and/or γ-glycidoxypropyltriethoxysilane because these additives are readily available and inexpensive, and it is especially preferable to add γ-glycidoxypropyltriethoxysilane.

The amount added of the above-listed silane coupling agents is preferably 0.1 to 50 parts by mass with respect to 100 parts by mass of the epoxy resin (B), and is more preferably 7 to 20 parts by mass in light of the favorable miscibility with the resin and the improvement in adhesion to fibers.

A cured product of the present invention is obtained by curing the resin composition for a fiber-reinforced plastic of the present invention. The method for curing the resin composition for a fiber-reinforced plastic of the present invention is not particularly limited, and curing can be performed using a known method. Specifically, the resin composition for a fiber-reinforced plastic of the present invention can be cured through heating. Also, in the case where the resin composition for a fiber-reinforced plastic of the present invention contains the light-absorbing component (D), the curing time can be reduced even further by irradiating the resin composition with active energy rays. As a result of the reduction in the curing time, the operation time is reduced, and curing can be performed with less energy compared with a case where curing is performed through heating. Therefore, not only economic advantages but also environmental advantages can be obtained.

There is no particular limitation on the above-described active energy rays, and appropriate active energy rays can be selected depending on the purpose. Examples of the active energy rays include an electron beam, ultraviolet rays, infrared rays, a laser beam, visible rays, ionizing radiation (X-rays, α-rays, β-rays, γ-rays, and the like), microwaves, and high-frequency waves.

In the present invention, among these active energy rays, it is preferable to use a laser beam and/or infrared rays because the curing rate can be increased even further, and it is more preferable to use infrared rays.

Examples of the above-described laser beam include a solid-state laser that uses ruby, glass, or YAG (a crystalline material in which a trace amount of rare earth is added to yttrium, aluminum, and garnet) as a medium; a liquid laser that uses a liquid in which a dye is dissolved in a solvent, such as water or an alcohol, as a medium; a gas laser that uses $CO_2$, argon, an He—Ne mixed gas, or the like as a medium; and a semiconductor laser that uses recombination radiation of a semiconductor. In the present invention, it is preferable to use a semiconductor laser, which is inexpensive and facilitates output control.

The wavelength of the laser beam used in the present invention is not particularly limited, and, for example, if the laser beam is in the near-infrared region (the wavelength is about 0.7 to 2.5 μm), the resin composition can be cured. The output of the laser beam is also not particularly limited, and the resin composition can be cured with the output within a range of 1 W to 4 kW, for example.

The time for which laser irradiation is performed is also not particularly limited, and varies widely depending on the irradiation area and the output. For example, the resin composition can be cured within a range of 0.2 $W/mm^2$ to 10 $W/mm^2$. The wavelength of the infrared rays for curing the resin composition of the present invention is also not particularly limited. For example, the resin composition can be cured using infrared rays with wavelength in any region, such as the near-infrared region (the wavelength is about 0.7 to 2.5 μm), the mid-infrared region (the wavelength is about 2.5 to 4 μm), and the far-infrared region (the wavelength is about 4 to 1,000 μm).

An example of the method for irradiating the resin composition of the present invention with infrared rays for curing the resin composition is an irradiation method that uses an infrared heater. Examples of the infrared heater include a halogen heater, a quartz heater, a sheathed heater, a ceramic heater, and the like. A halogen heater enables irradiation with infrared rays with wavelengths ranging from the near-infrared region to the mid-infrared region, and a quartz heater, a sheathed heater, and a ceramic heater also enable irradiation with infrared rays with wavelengths ranging from the mid-infrared region to the far-infrared region. Among these infrared heaters, it is preferable to use a halogen heater, because the time from when the power is turned on to when the heat source is heated is short, making it possible to realize quick heating.

The wavelength of infrared rays for curing the resin composition of the present invention is not particularly limited, and various wavelength regions can be used depending on the absorption region of the light-absorbing component that is used. For example, in the case where a nigrosine compound is used, the resin composition of the present invention can be cured in a short period of time using infrared rays in the near-infrared region (the wavelength is about 0.7 to 2.5 μm).

A fiber-reinforced plastic of the present invention can be obtained by curing a matrix resin (composition) of a fiber-reinforced plastic, the matrix resin containing the resin composition for a fiber-reinforced plastic of the present invention and a reinforcing fiber in a uniform manner. In the present invention, "containing the resin composition for a fiber-reinforced plastic and a reinforcing fiber in a uniform manner" means that the resin composition has completely permeated throughout the inside of the fibers without remaining on the surface. The type of the reinforcing fiber is not particularly limited, and, for example, a carbon fiber, a glass fiber, an aramid fiber, a boron fiber, an alumina fiber, a silicon carbide fiber, and the like may be used alone, or may be used as a hybrid fiber composed of two or more of these fibers.

The forms of the above-listed reinforcing fibers include a so-called Towsheet in which high-strength and high-elastic-modulus fibers are aligned in one direction, a unidirectional woven fabric or a bidirectional woven fabric in which the fibers are aligned in one direction or two directions, a three-axis woven fabric in which the fibers are aligned in three directions, a multi-axis woven fabric in which the fibers are aligned in multiple directions, and the like. In the Towsheet, it is preferable to align the fibers such that a suitable gap is secured between the strands in order to improve impregnation of the base material with the resin.

The amount of the reinforcing fiber that is used with respect to the resin composition for a fiber-reinforced plastic of the present invention is not particularly limited, and can be appropriately determined depending on the use of the fiber-reinforced plastic to be obtained. However, for example, the volume fraction of the reinforcing fiber with respect to the total volume of the resin composition for a fiber-reinforced plastic is preferably 45 to 70%, and more preferably 50 to 65%. Moreover, the method for curing the matrix resin of a fiber-reinforced plastic is also not particularly limited, and, for example, curing can be performed in a similar manner to the above-described method for curing the resin composition for a fiber-reinforced plastic of the present invention.

The method for forming a fiber-reinforced plastic using the resin composition of the present invention is not particularly limited, and examples thereof include extrusion molding, blow molding, compression molding, vacuum forming, injection molding, RTM (Resin Transfer Molding), VaRTM (Vacuum assist Resin Transfer Molding), laminate molding, hand lay-up, filament winding, and the like.

A fiber-reinforced plastic that is obtained using the resin composition of the present invention can be used in various applications. Examples of such applications include general industrial applications including structural materials of moving bodies such as automobiles, ships, and railway vehicles, drive shafts, leaf springs, wind turbine blades, pressure vessels, flywheels, paper mill rollers, roofing, cables, repairing and reinforcing materials, and the like; aerospace applications including fuselages, wings, empennages, flight control surfaces, fairings, cowlings, doors, seats, interior finishing materials, motor cases, antennas, and the like; and sports applications including golf shafts, fishing rods, rackets for tennis, badminton, and the like, sticks for hockey and the like, and ski poles.

EXAMPLES

Hereinafter, the present invention will be described in detail using examples. Note that "%" as used in the following examples and the like means the percentage by mass, unless otherwise specified.

Example 1

To a 500-mL disposable cup were added 100 g of LECy (1,1-bis(4-cyanatophenyl)ethane manufactured by Lonza; the average number of cyanate groups was 2) as the cyanate ester (A), 75 g of ADEKA RESIN EP-4901E (bisphenol F type epoxy resin manufactured by ADEKA Corporation and having an epoxy equivalent weight of 170 g/eq.; the average number of epoxy groups was 2) and 12.5 g of MY-0510 (N,N-bis(2,3-epoxypropyl)-4-(2,3-epoxypropoxy)-2-methylaniline manufactured by Huntsman Corporation and having an epoxy equivalent weight of 101 g/eq.; the average number of epoxy groups was 3) as the epoxy resin (B), and 70 g of KAYAHARD AA (diaminodiethyldiphenylmethane manufactured by Nippon Kayaku Co., Ltd.) as the (C) aromatic amine-based curing agent that is liquid at 25° C., followed by stirring with a spatula at 25° C. for 5 minutes. Then, stirring was further performed using a planetary type stirring machine to obtain a mixture. The obtained mixture was evaluated based on the glass transition temperature (Tg) and a bending test according to the following methods.

Measurement of Tg

Five milligrams of the above-described mixture was weighed into a pan for differential scanning calorimetry, heated at 80° C. for 5 hours, and then further heated at 150° C. for 2 hours to thereby cure the mixture. After that, heating was performed by a differential scanning calorimeter (DSC6220ASD-2 manufactured by Seiko Instruments Inc.) under a temperature increase condition of 10° C./minute, and Tg was measured by reading a point of inflection of the differential scanning calorie. Table 1 shows the results.

Bending Test

First, 100 g of a glass fiber (UDR S14EU970-01190-00100-100000 manufactured by SAERTEX) was impregnated with 33 g of the obtained mixture using a roller. Then, the resin-impregnated glass fiber was placed in a constant temperature bath at 150° C., and the resin was cured for 3 hours. With respect to the thus obtained resin-fiber composite (fiber-reinforced plastic) after curing of the resin, the upper-yield stress, the maximum point stress, the modulus of elasticity, and the interlaminar shear were measured according to methods that were in conformity with JIS K 7057. Table 1 shows the results.

Examples 2 to 8 and Comparative Example 1

Mixtures of Examples 2 to 3 and Comparative Example 1 were obtained by performing similar operations to those of Example 1 except that the composition was changed as shown in Table 1. The obtained mixtures were evaluated based on Tg and the bending test in a manner similar to that of Example 1. Table 1 shows the results.

and an average number of epoxy groups in the epoxy resin (B) expressed as a formula (2) below is 2.5 to 4:

$$\text{Average number of cyanate groups} = \sum_{i=1}^{n} \frac{(A_i \times X_i)}{100} \quad (1)$$

wherein, in the formula (1), "n" represents the number of types of cyanate ester components contained in the cyanate ester (A), $A_i$ represents the number of cyanate groups in an i-th cyanate ester component contained in the cyanate ester (A), and $X_i$ represents the content ratio by mass of the i-th cyanate ester component in the cyanate ester (A), and

TABLE 1

| | | Ex. 1 | Ex. 2 | Ex. 3 | Ex. 4 | Ex. 5 | Ex. 6 | Ex. 7 | Ex. 8 | Com. Ex. 1 |
|---|---|---|---|---|---|---|---|---|---|---|
| Component (A) | LECy | 100 | 100 | 100 | 100 | 100 | 100 | 90 | 60 | 100 |
| | PT-30*[1] | | | | | | | 10 | 40 | |
| Component (B) | EP-4901E | 75 | 50 | 25 | 50 | 25 | | 60 | 100 | 100 |
| | MY-0510 | 25 | 50 | 75 | | | | 40 | | |
| | MY-721*[2] | | | | 50 | 75 | 100 | | | |
| Component (C) | KAYAHARD AA | 70 | 70 | 70 | 70 | 70 | 70 | 70 | 70 | 70 |
| Average number of cyanate groups in component (A)*[3] | | 2 | 2 | 2 | 2 | 2 | 2 | 2.5 | 4.1 | 2 |
| Average number of epoxy groups in component (B)*[4] | | 2.3 | 2.5 | 2.8 | 3 | 3.5 | 4 | 2.4 | 2 | 2 |
| Bending test | Upper-yield stress (MPa) | 1153 | 1227 | 1126 | 1212 | 1170 | 1215 | 1205 | 1239.2 | 1144 |
| | Maximum point stress (MPa) | 1197 | 1284 | 1219 | 1254 | 1216 | 1251 | 1313 | 1316.2 | 1195 |
| | Modulus of Elasticity (MPa) | 39599 | 40833 | 38760 | 39152 | 38412 | 39250 | 38133 | 39347 | 38928 |
| | Interlaminar shear (MPa) | 61.8 | 57.6 | 58.9 | 55.2 | 54.8 | 57.5 | 71.4 | 80 | 61.7 |
| Tg | °C. | 123.6 | 153.8 | 154.9 | 139.6 | 160 | 180.4 | 138.3 | 126.3 | 111.3 |

*[1]Phenol novolac type multifunctional cyanate ester (manufactured by Lonza; the average number of cyanate groups was 7.3)
*[2]N,N,N',N'-tetra(2,3-epoxypropyl)-4,4'-diaminodiphenylmethane (manufactured by Huntsman Corporation and having an epoxy equivalent weight of 114 g/eq.; the average number of epoxy groups was 4)
*[3]The average number of cyanate groups in the component (A) was calculated using the formula (1) above.
*[4]The average number of epoxy groups in the component (B) was calculated using the formula (2) above.

The invention claimed is:

1. A resin composition for a fiber-reinforced plastic, the resin composition comprising:

at least one cyanate ester (A), at least one epoxy resin (B), and at least one aromatic amine-based curing agent that is liquid at 25° C. (C), wherein (B) contains at least one multifunctional epoxy resin selected from the group consisting of N,N-bis(2,3-epoxypropyl)-4-(2,3-epoxypropoxy)-2-methylaniline, N,N-bis(2,3-epoxypropyl)-4-(2,3-epoxypropoxy) aniline, and N,N,N',N'-tetra(2,3-epoxypropyl)-4,4'-diaminodiphenylmethane;

wherein (A) is present in an amount of 10 to 200 parts by mass per 100 parts by mass of (B);

wherein (C) is present in an amount of 20 to 100 parts by mass per 100 parts by mass of (B);

wherein an average number of cyanate groups in the cyanate ester (A) expressed as a formula (1) below is 2, $$\text{Average number of epoxy groups} = \sum_{k=1}^{n} \frac{(B_k \times Y_k)}{100} \quad (2)$$

wherein, in the formula (2), "n" represents the number of types of epoxy resin components contained in the epoxy resin (B), $B_k$ represents the number of epoxy groups in a k-th epoxy resin component contained in the epoxy resin (B), and $Y_k$ represents the content ratio by mass of the k-th epoxy resin component in the epoxy resin (B).

2. The resin composition for a fiber-reinforced plastic as set forth in claim 1, wherein (A) contains at least one of a compound represented by a general formula (3-1) below and a prepolymer of the compound represented by the general formula (3-1) below:

NCO—$R^b$—$R^a$—$R^c$—OCN    (3-1)

wherein, in the general formula (3-1), $R^a$ represents a single bond, —S—, or a divalent hydrocarbon group, and $R^b$ and $R^c$ each independently represent a phenylene group that is unsubstituted or substituted with 1 to 4 alkyl groups, and when $R^b$ and $R^c$ are substituted with 2 to 4 alkyl groups, the alkyl groups may be the same or different.

3. The resin composition for a fiber-reinforced plastic as set forth in claim 2, wherein the compound represented by the general formula (3-1) is a compound represented by a general formula (3-3) below:

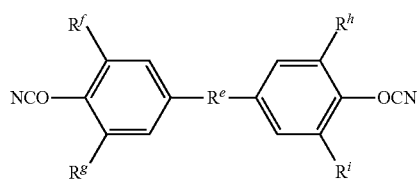
(3-3)

wherein, in the general formula (3-3), $R^e$ represents a single bond, a methylene group, —CH(CH$_3$)—, —C(CH$_3$)$_2$—, or any one of functional groups represented by general formulae (4-1) to (4-8) below, and $R^f$, $R^g$, $R^h$, and $R^i$ each independently represent a hydrogen atom or an alkyl group having 1 to 4 carbon atoms,

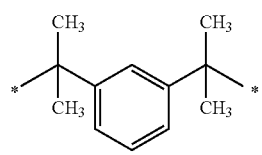
(4-1)

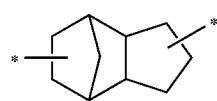
(4-2)

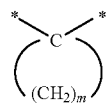
(4-3)

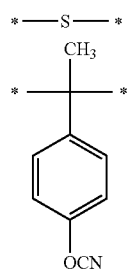
(4-4)

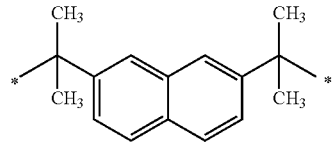
(4-6)

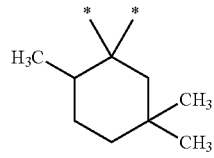
(4-7)

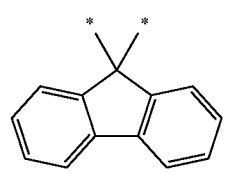
(4-8)

wherein, in the general formula (4-3), "m" represents an integer of 4 to 12, and in the general formulae (4-1) to (4-8), "*" represents a bond.

4. The resin composition for a fiber-reinforced plastic as set forth in claim 3, wherein (C) is at least one compound selected from the group consisting of diaminodiphenylmethane, diaminodiethyldiphenylmethane, and diaminodiethyltoluene.

5. A cured product which is obtained by curing the resin composition for a fiber-reinforced plastic as set forth in claim 3.

6. A fiber-reinforced plastic which is obtained by curing a composition containing the resin composition as set forth in claim 3 and a reinforcing fiber.

7. The resin composition for a fiber-reinforced plastic as set forth in claim 2, wherein (C) is at least one compound selected from the group consisting of diaminodiphenylmethane, diaminodiethyldiphenylmethane, and diaminodiethyltoluene.

8. A cured product which is obtained by curing the resin composition for a fiber-reinforced plastic as set forth in claim 2.

9. A fiber-reinforced plastic which is obtained by curing a composition containing the resin composition as set forth in claim 2 and a reinforcing fiber.

10. The resin composition for a fiber-reinforced plastic as set forth in claim 1, wherein (C) is at least one compound selected from the group consisting of diaminodiphenylmethane, diaminodiethyldiphenylmethane, and diaminodiethyltoluene.

11. A cured product which is obtained by curing the resin composition for a fiber-reinforced plastic as set forth in claim 10.

12. A cured product which is obtained by curing the resin composition for a fiber-reinforced plastic as set forth in claim 1.

13. A fiber-reinforced plastic which is obtained by curing a composition containing the resin composition as set forth in claim 1 and a reinforcing fiber.

* * * * *